United States Patent [19]
Löbel

[11] Patent Number: 5,338,259
[45] Date of Patent: Aug. 16, 1994

[54] COMPOSITE SHAFT COUPLING ELEMENT HAVING REINFORCED EYES

[75] Inventor: Wolfgang Löbel, Frankfurt am Main, Fed. Rep. of Germany

[73] Assignee: Löhr & Bromkamp GmbH, Offenbach am Main

[21] Appl. No.: 780,796

[22] Filed: Oct. 22, 1991

[30] Foreign Application Priority Data

Oct. 23, 1990 [DE] Fed. Rep. of Germany ....... 4033596

[51] Int. Cl.⁵ .............................................. F16D 3/78
[52] U.S. Cl. .................................................. 464/93
[58] Field of Search ................................. 464/92–94, 464/96, 98, 99, 69, 81

[56] References Cited

U.S. PATENT DOCUMENTS

| | | | |
|---|---|---|---|
| 1,588,031 | 6/1926 | Kimmich | 464/94 |
| 4,790,794 | 12/1988 | Takeda et al. | 464/93 |
| 4,943,261 | 7/1990 | Smith | 404/81 X |

FOREIGN PATENT DOCUMENTS

| | | |
|---|---|---|
| 3725957 | 3/1989 | Fed. Rep. of Germany . |
| 0359916 | 3/1990 | Fed. Rep. of Germany . |
| 9008268 | 7/1990 | PCT Int'l Appl. .............. 464/92 |
| 321999 | 11/1929 | United Kingdom ............ 464/93 |
| 2042977 | 10/1980 | United Kingdom . |
| 2208697 | 12/1989 | United Kingdom . |

Primary Examiner—Daniel P. Stodola
Attorney, Agent, or Firm—Harness, Dickey & Pierce

[57] ABSTRACT

A resilient shaft coupling element made of fiber composite material layers, preferably with the layers of fibers oriented differently, is in the form of a polygonal ring having attachment holes for alternately receiving bolts, pins, etc. for two axially adjoining shaft connectors. The polygonal ring comprises thin straight webs connected by adjoining thick reinforced eyes. The reinforced eye has attachment holes centered radially inwardly from the intersections of the longitudinal center axes of the straight webs in the reinforced eye adjoining the webs.

13 Claims, 2 Drawing Sheets

COMPOSITE SHAFT COUPLING ELEMENT HAVING REINFORCED EYES

BACKGROUND OF THE INVENTION

The present invention relates to a resilient shaft coupling element made of a fiber composite material. The coupling element permits shafts to be connected that are axially and angularly offset. The resilient coupling element is designed in the form of a polygonal ring with a plurality of holes for receiving bolts or pins for, alternatively, securing two axially adjoining flange or connecting shaft elements. The polygonal ring is designed as a single polygonal ring of substantially planar configuration and comprising alternate relatively thin straight web regions connected to alternately reinforced eye regions having the attachment holes. The reinforced eye regions ("reinforced eyes" herein) adjoin the web regions perpendicularly relative to the longitudinal direction of the web. The straight webs and reinforced eyes serve to accommodate small angular and axial changes in the drivelines. These elements in the polygonal ring must accommodate a high torque while being capable of flexibility in order to join axial shafts that have axial and angular offsets.

A shaft coupling element of a similar type is known from the German Patent Application DE 37 25 957 C1.

SUMMARY OF THE INVENTION

The straight web elements are preferably made of composite fiber layers. The central composite layer of the straight webs are preferably oriented at an angle of 0° relative to the web longitudinal central axis. The web longitudinal central axis is an axis that is perpendicular to a line drawn from the center of the polygonal ring to the center of the web. The outer composite fiber layers of the straight webs are preferably alternately arranged at an angle of 45° to the straight web central longitudinal axis. It has been found that at high torque loads, as a result of which half of the straight web regions are subjected to tensile loads and the other half of the straight web regions to compress ire loads, especially if other types of loads result from axial displacement and joint articulation are superimposed, the straight webs and the reinforced eyes may develop material cracks extending from the outer edges of the elements to the attachment holes. One of the objects of the present invention is to avoid such damage, thereby achieving a higher durability and longer service life of the coupling elements.

The present invention achieves the above object by radially moving the attachment holes inwardly in the reinforced eyes with respect to the straight web longitudinal center axes intersections. If the attachment holes were to be centered in the polygonal ring, the attachment hole centers would intersect with the straight web longitudinal center axes M (see FIG. 1) of adjacent straight webs at their point of intersection. However, it has been found that when the centers of the attachment holes S' are moved inwardly as described hereinafter, a bending load is superimposed on the straight webs, which are also subjected to tensile loads when the polygonal ring is subject to torque loads. In the crack-endangered outer fibers, that is the composite fibers on the outer side of the polygonal ring, the bending load reduces the tensile forces on the outer fiber and the inner fibers, that is the fibers of the composite material on the inner side of the polygonal ring, which are not crack-endangered, are subject to a non-critical increase in tensile stress. Thus by reducing the tensile loads on the outer areas of the polygonal ring, in return for a non-destructive increase in the tensile stress on the inner portions of the polygonal ring, a more durable, resilient shaft coupling element is obtained.

Preferably, the attachment holes are located at the intersection of the straight web longitudinal offset lines M' which are parallel to the straight web longitudinal center lines M. The distance between the lines M' and M is less than 10% of the width of the straight webs. Preferably, the distance between the lines is about 7% of the width of the straight webs. With the web configuration of the present polygonal ring, this design provides that the outer fibers of the polygonal ring are subject to a decrease in tensile stress and, that the increase of tensile forces, as a result of the bending load, to the inner fibers of the polygonal ring do not reach critical values, that is do not reach failure modes.

In a further embodiment of the present invention, the attachment holes are located at intersections S' of lines M' of adjoining straight webs and the reinforced eyes with the lines M' being parallel to the straight web longitudinal center lines M. Preferably in this embodiment, the distances of the lines M' from the inner edge of their respective straight webs and from the outer edge of their respective straight webs being at the ratio of about 0.75:1.0. In this embodiment, with this configuration of the attachment holes in the eye regions, stresses are reduced to the outer fibers of the composite material and stress forces are increased to the inner fibers of the composite material, but not to an endangering point.

The polygonal ring is preferably designed to have relatively thin straight web elements and thicker reinforced eyes. In the preferred embodiment of the invention, the straight web elements have a thickness of about 4 to about 5 per cent of the straight web width, that is the distance between the inner edge and the outer edge of the straight web. The reinforced eyes are preferably thicker. Preferably, their thickness is about 2 to about 4 times that of the straight webs. The transition zones from the reinforced eyes to the straight webs, which are perpendicular to the straight web longitudinal central axis, are rounded to eliminate a sharp edge or corner between the straight webs and the reinforced eyes. The difference in thickness between the straight webs and the reinforced eyes are achieved in any one of a number of different ways. For example, more layers of prepegs, that is the layers of fiber of the composite material, can be doubly overlapped in the reinforced eyes. Alternatively, the prepegs in the straight web elements can be compressed more densely to achieve a thinner cross section. In a third embodiment, the prepegs from the straight web sections can be overlapped in the reinforced eyes so that the reinforced eyes have at least twice the number of fiber layers as the web sections. This in conjunction with compressing the fiber layers more densely in the web region will achieve the desired thickness relationship between the straight webs and the reinforced eyes.

In the preferred embodiment of the present invention, the polygonal ring should have the attachment holes which are radially inwardly offset in such a way that under maximum torsional loading of the outer edge of the straight webs subjected to tensile loads, the stress generated by the tensile forces are reduced by approximately 45% as a result of the superimposed stress at the same time generated by the bending forces when compared with the polygonal ring having the attachment holes arranged at the intersection of the straight webs longitudinal central axes M in the reinforced eye regions.

For shaft coupling elements which are subject to purely torsional loading, it may be advantageous to use exclusively prepegs with the fibers oriented in the direction of the straight web longitudinal central axis. However, pure torsional loads do not represent the normal loading that a resilient shaft coupling element undergoes in operation. Most couplers between axially oriented shafts are subject to axial offsets, and bending loads occur. In that situation, it is advantageous to have some of the prepegs with the fibers oriented in the direction of the straight web longitudinal central axis and to have other layers of prepegs oriented such that their fibers are at an angle of between 30° and 60°, preferably about 45° relative to the longitudinal central axis of the straight webs. In a third embodiment of the present invention, the central layers of prepegs are oriented with their fibers at about a 0° angle with respect to the longitudinal central axis of the straight webs and the outer layers are oriented with their fibers at about 45° to the longitudinal central axis.

The polygonal rings can also be fabricated with winding technology. The winding technology can easily arrange the fiber direction parallel to the longitudinal central axes of the straight webs. When the winding technology is used, the attachment holes do not have to be bored or cut into the polygonal ring either after its completion or during its construction. When winding technology is employed, the central core or layer of the polygonal ring may be wound without interruption of the fibers and wound around to leave the attachment holes.

In the preferred embodiment of the present invention, the polygonal ring is given a symmetrical shape relative to its central plane. With the use of such design, it is possible to achieve a high degree of flexibility for the resilient shaft coupling element, as well as a high load bearing capacity. The rectangular delineation of the reinforced eyes relative to the longitudinal direction of the straight webs provides clean bending lines in the straight webs without introducing torsional forces as a result of different fiber lengths in the straight webs.

In a particularly preferred embodiment of the present invention, the fiber layers of the straight webs run into the adjoining reinforced eyes so that there are no weak areas in the transition regions from the straight webs to the reinforced eyes. In a preferred embodiment, the polygonal ring is made up of approximately C-shaped individual elements; each element comprising a central straight web portion and two adjoining reinforced eye portions at opposing ends. Preferably the transition zones from the straight webs to the reinforced eye regions are rounded when viewed from the side in order to avoid any sharp corners or notch effect. To increase the material thickness of the reinforced eyes, the reinforced eyes may comprise intermediate additional layers of composite material which can be oriented in any direction.

The attachment holes are provided in order to receive bolts, pins or the like to connect the resilient shaft coupling element with flanges or shaft connecting elements. The connecting elements can comprise a plurality of flange fingers which are circumferentially distributed and alternately are connected to the attachment holes by nuts and bolts, pins, rivets and the like. The connecting elements are connected to the shaft by conventional means. If the attachment holes are numbered consecutively 1–6, the flange fingers of one connecting element on one side of the resilient shaft coupling element will be connected to bolts running through holes 1, 3 and 5 and the flange fingers of the connecting element on the other side of the resilient shaft coupling element will be connected with bolts through holes 2, 4 and 6.

In one preferred embodiment of the present invention, at least one of the connecting elements is made of a formable material and is formed with the resilient shaft coupling element into an integrated body wherein half, on an alternative basis, reinforced eye regions are integrally formed with the connecting element.

If the resilient shaft coupling element does not have to function as a separator element for two separate shafts, that is if the resilient shaft coupling element does not have to be disassembled from the shafts in order that the shafts can be separated, the connecting elements on both sides of the resilient shaft coupling element can be made of a formable material. The connecting elements on one side of the resilient shaft coupling element are formed with alternate reinforced eyes. The other connecting elements on the other side of the resilient shaft coupling element are formed with the remaining reinforced eyes.

The connecting elements for the shaft may be provided with counter flanges for connection to the shaft. Preferably however, the connecting elements for the shaft have tubular sleeves. The sleeves are adapted to receive shafts by press fits, glued connections, screwed connections, welding, pins and the like. The material for such connecting element may be any formable, injectable, moldable, or kneadable material which during the forming operation does not damage the shaft coupling element. It is possible to use plastics mixed with short fibers, such as thermo-plastics or sinterable granules of plastics or metal.

DETAILED DESCRIPTION OF THE DRAWINGS

Figure 1:
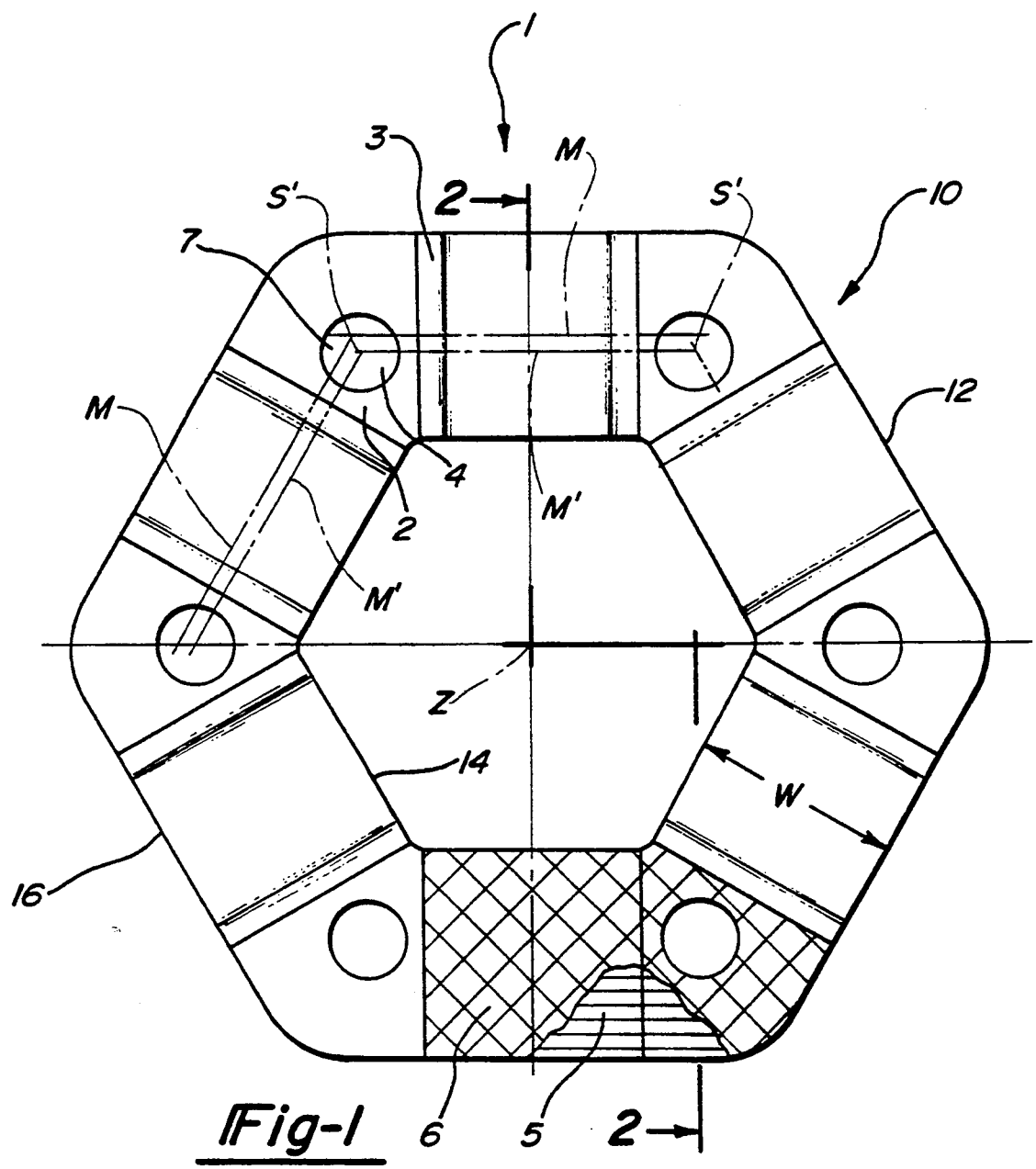
FIG. 1 shows a front view of the resilient shaft coupling element of the present invention.

Referring to FIG. 1, resilient shaft coupling element 10 comprises a polygonal ring 12 having a plurality of straight webs 1 connected together with a plurality of reinforced eyes 2. Straight webs 1 have an inner edge 14 and an outer edge 16. Each straight web has longitudinal ends connected to reinforced eyes 2 through transition zones 3. The transition zone 3 is curved in order to prevent any sharp corners or notches between the straight web 1 and the reinforced eye 2 which would concentrate stresses and cause failures (see FIG. 2). The straight webs 1 are substantially thinner than the reinforced eyes 2 (See FIG. 2). Preferably the thickness of the web is between about 4% and about 5% of the width W of the straight web. Preferably the reinforced eye is from about 2 to about 4 times the thickness of the webs.

The longitudinal central axis of the straight webs is designated as M. As described above, the attachment holes 7 are centered at point S', which is the intersection point of lines M' of straight webs adjoining a reinforced eye. Lines M' are radially inwardly offset from the longitudinal central axis M and are parallel to the axis. Preferably, the distance between axis M and line M' is less than 10% of the width W of the straight webs. Most preferably, the distance between axis M and line M' is about 7% of the width W of the straight webs.

In an alternative embodiment of the present invention, the ratio of the distances from line M' to the outer edge 16 of the straight web and the distance from line M' to the inner edge 14 of the straight web is about 0.75 to 1. With either of the above design parameters with respect to the location of the attachment holes 7, the stress generated by tensile forces under torsional loading at the outer edge 16 is reduced by approximately 45% as a result of the superimposed stress generated by bending forces created by the shafts which are connected to the resilient shaft coupling element 1 and which undergo some axial offset and angular offset. The location of the attachment holes 7 does increase the tensile forces applied to the inner edges 14 of the polygonal ring 12, but does not increase the tensile forces to a failure endangering mode. Thus, for a substantial decrease in the tensile forces applied to the outer edge, a small increase in tensile forces is applied to the inner edge.

The polygonal ring is made up of layers of fiber oriented composite materials, such as graphite fibers, fiberglass, and the like bound together with epoxy resins or like resins. Preferably, the inner layer 5 of the straight web 2 have the fibers aligned parallel to, that is at 0° to the longitudinal central axis M of the straight web. The central layer of the straight web preferably extends to the adjoining reinforced eye. The outer layers 6 of the polygonal ring 12 are preferably oriented between 30° and 60° to the inner layer 5. In the preferred embodiment of the present invention, the fiber orientation of the outer composite material layers are oriented at approximately 45° to the fiber orientation of the inner layer 5. In the preferred embodiment of the present invention, the center layer 5 constitutes about 50% of the thickness T of the straight web and each outer fiber layer, which sandwich the inner fiber layer constitute about 25% of the thickness of the straight web. Although the thickness of the web and the reinforced eye can vary from resilient shaft coupling element to resilient shaft coupling element, depending upon the size of the polygonal ring and the forces to be applied to the coupling element, it has been found that for many applications a thickness of about 1.5 min. works quite satisfactorily for the web. Preferably the reinforced eyes are about 2 to about 4 times the thickness of the straight web.

Figure 2:
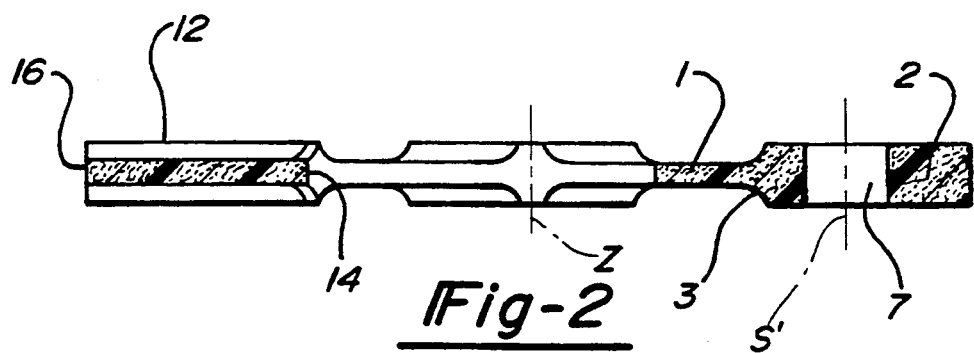
FIG. 2 is a side view of the resilient shaft coupling element of FIG. 1 along lines 2—2.
Figure 3:
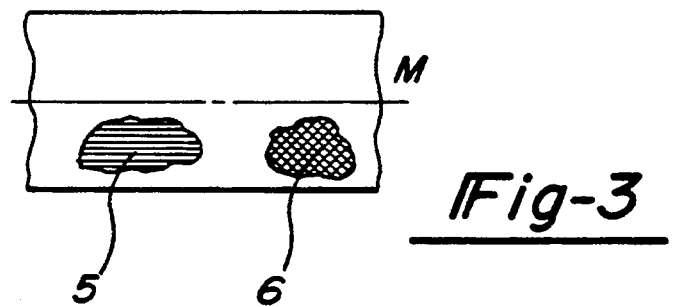
FIG. 3 is a plan view of a straight web of the resilient shaft coupling element of FIG. 1.
Figure 3A:
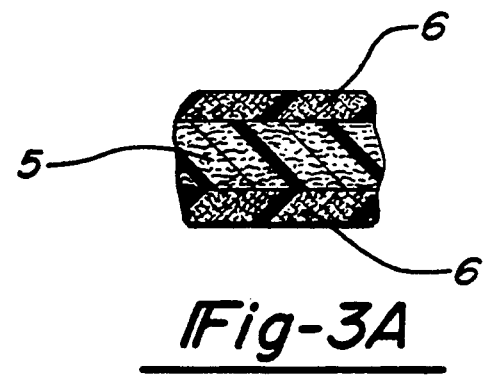
FIG. 3a is an enlarged side sectional view (sectional edge view) of the straight web of resilient shaft coupling element of FIG. 3.
Figure 4:
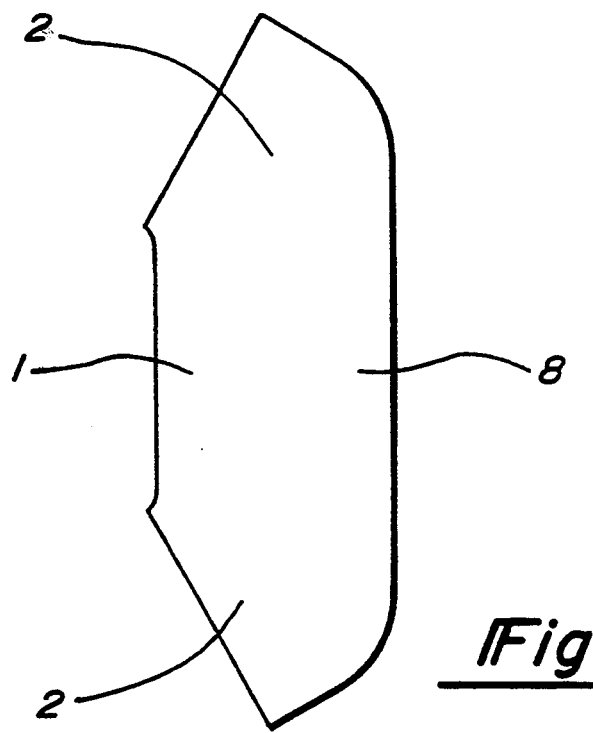
FIG. 4 is a plan view of an individual prepeg element, including the straight web and adjoining reinforced eyes, of the resilient shaft coupling element used in fabrication.

The difference in thickness between the straight web and the reinforced eye can be achieved in a number of ways. In one embodiment of the present invention, when the prepegs of the composite material are assembled during fabrication and when formed into the polygonal ring, the web sections can be more densely compressed than the reinforced eyes to obtain the desired thicknesses. In an alternative embodiment, the eye is made up of layers from its two adjoining straight webs, thus having twice as many layers as the straight web sections. In additions, such web sections can also have additional layers added to it to obtain the desired thickness relationship between the webs and the eye regions. In the preferred embodiment of the present invention, the polygonal ring has a symmetrical design such that all of the outer edges 16, inner edges 14, and attachment holes 7 are equal distances, respectively, from the center Z of the polygonal ring. In FIGS. 1, 2 and 4, the polygonal ring is a regular hexagonal ring. However, other polygonal shapes may be employed.

Referring to FIG. 4, a prepeg element 8 of the composite fiber material is shown having a central area which will comprise the straight web 1 and two end regions which will comprise the adjoining reinforced eyes 2. If the prepeg element is the inner layer 5, the fiber orientation will extend longitudinally along the element from an area to be the reinforced eye to the opposite end which is to be an area of the reinforced eye. If the prepeg 8 is to be one of the outer layers 6, the fiber orientation will be 30° to 60° from the fiber orientation for the prepeg element 8 of the inner layer 5. Preferably the fiber orientation for the outer layer 6 is about 45°. After the elements 8 are assembled to form the polygonal ring 12, the material is set up, such as with a thermosetting resin, to form the polygonal ring 12 of FIG. 1. The holes 7 are bored in afterwards to form the resilient shaft coupling element 10.

What is claimed is:

1. A resilient shaft coupling element permitting axial and angular offset of the shafts comprising a polygonal ring made of fiber composite material, the ring having attachment holes for alternatively securing two axially adjoining shaft connectors, the polygonal ring having a substantially planar configuration and consisting of a plurality of thin straight webs connected together with a plurality of reinforced eyes, each straight web having a longitudinal central axis which is perpendicular to a line drawn from the center of the polygonal ring to the center of each straight web, the center of each of the attachment holes in the reinforced eyes being at the intersection of longitudinal lines of adjoining straight webs within the reinforced eye wherein the longitudinal lines are parallel to the longitudinal central axis of the straight webs and radially offset inwardly towards the center of the polygonal ring.

2. The resilient shaft coupling element of claim 1 wherein the distance between the longitudinal central axis of a web and the longitudinal line associated with such web is less than 10% of the width of the web between its outer edge and inner edge.

3. The resilient shaft coupling element of claim 1 wherein the distance between the longitudinal central axis of a straight web and the longitudinal line associated with such straight web is about 7% of the width of the web between its outer edge and inner edge.

4. The resilient shaft coupling element of claim 1 wherein the ratio of the distance of the longitudinal line associated with the straight web between the outer edge of the straight web and the line and the distance from the inner edge to the longitudinal line is about 0.75 to 1.0.

5. The resilient shaft coupling element of claim 1 wherein the thickness of each straight web is between about 4% and about 5% of the width of the straight web between its outer edge and its inner edge.

6. The resilient shaft coupling element of claim 5 wherein the thickness of the reinforced eye is about 2 to 4 times the thickness of the adjoining straight webs.

7. The resilient shaft coupling element of claim 1 wherein the straight webs comprise a central fiber layer of composite material with the fibers being oriented parallel to the longitudinal central axis of each straight web.

8. The resilient shaft coupling element according to claim 7 wherein the straight webs have outer fiber layers sandwiching the inner fiber layer, the orientation of the fibers of the outer layers being oriented at an angle of about 45° to the fiber orientation of the central fiber layer.

9. The resilient shaft coupling element according to claim 7 wherein the straight webs have outer fiber layers sandwiching the inner fiber layer, the outer fiber layers being oriented at an angle of about 30° to 60° of the orientation of the fibers of the central fiber layer.

10. The resilient shaft coupling element of claim 9 wherein the thickness of the central fiber layer is approximately 50% of the thickness of the straight web and the thickness of each of the outer layers is about 25% of the thickness of the straight web.

11. The resilient shaft coupling element of claim 10 wherein the thickness of the straight web is about 1.5 mm.

12. The resilient shaft coupling element of claim 1 wherein the fiber layers of the straight webs extend into the adjoining reinforced eyes.

13. The resilient shaft coupling element of claim 12 wherein the fiber layers of the straight webs are more densely compressed than the fiber layers of the adjoining reinforced eyes.

* * * * *

UNITED STATES PATENT AND TRADEMARK OFFICE
CERTIFICATE OF CORRECTION

PATENT NO. : 5,338,259
DATED : August 16, 1994
INVENTOR(S) : Wolfgang Lobel

It is certified that error appears in the above-indentified patent and that said Letters Patent is hereby corrected as shown below:

Column 1, line 42, "compress ire" should be --compressive--

Column 4, line 59, "DRAWINGS" should be --PREFERRED EMBODIMENT--

Column 5, line 60, "min." should be --mm.--

Column 6, line 6, "additions" should be --addition--

Signed and Sealed this

Sixth Day of June, 1995

Attest:

BRUCE LEHMAN

Attesting Officer

Commissioner of Patents and Trademarks